W. J. HOLMES.
SAW FILING MACHINE.
APPLICATION FILED JAN. 6, 1908.

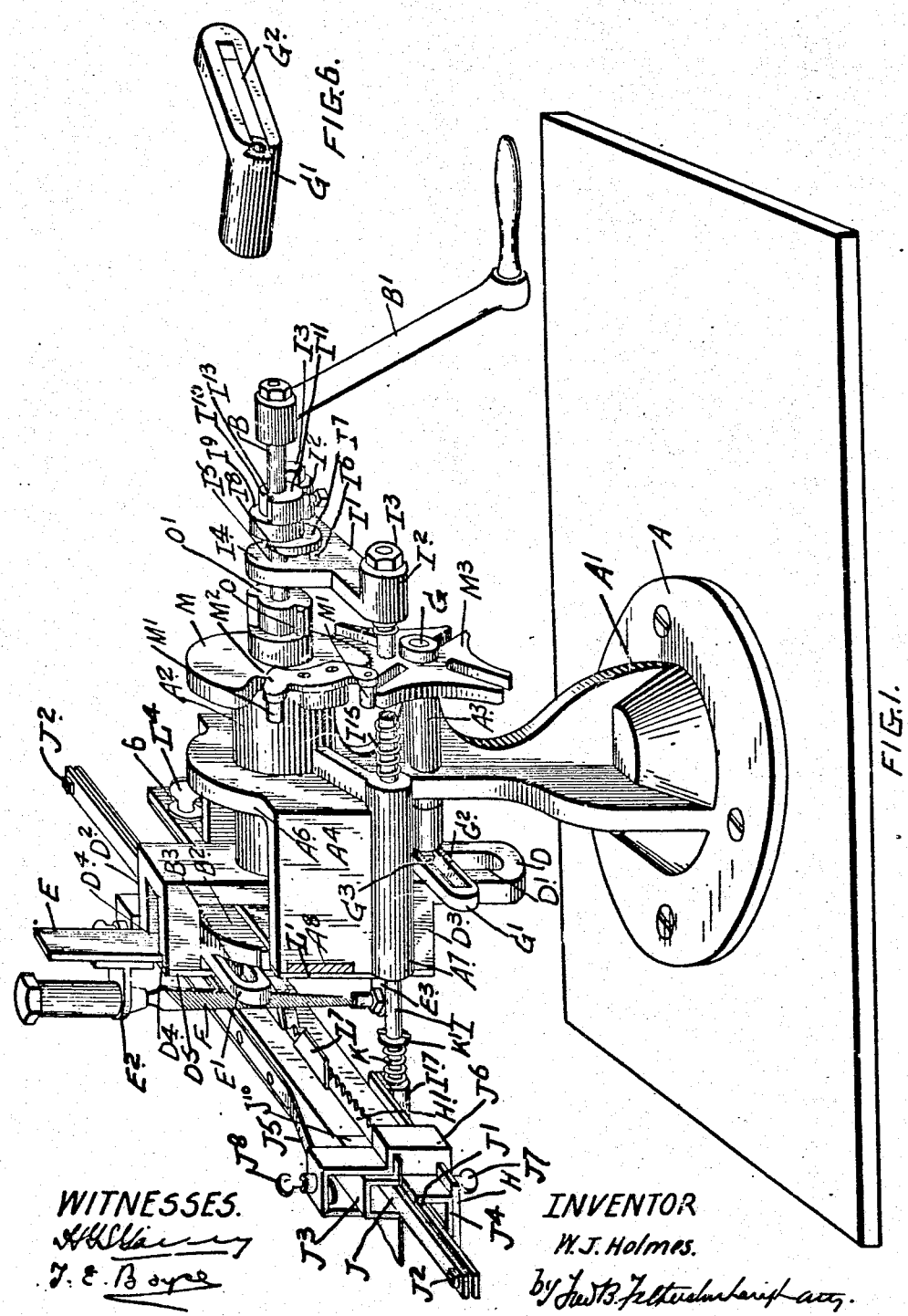

923,266.

Patented June 1, 1909.
3 SHEETS—SHEET 2.

WITNESSES.

INVENTOR.
W. J. Holmes.

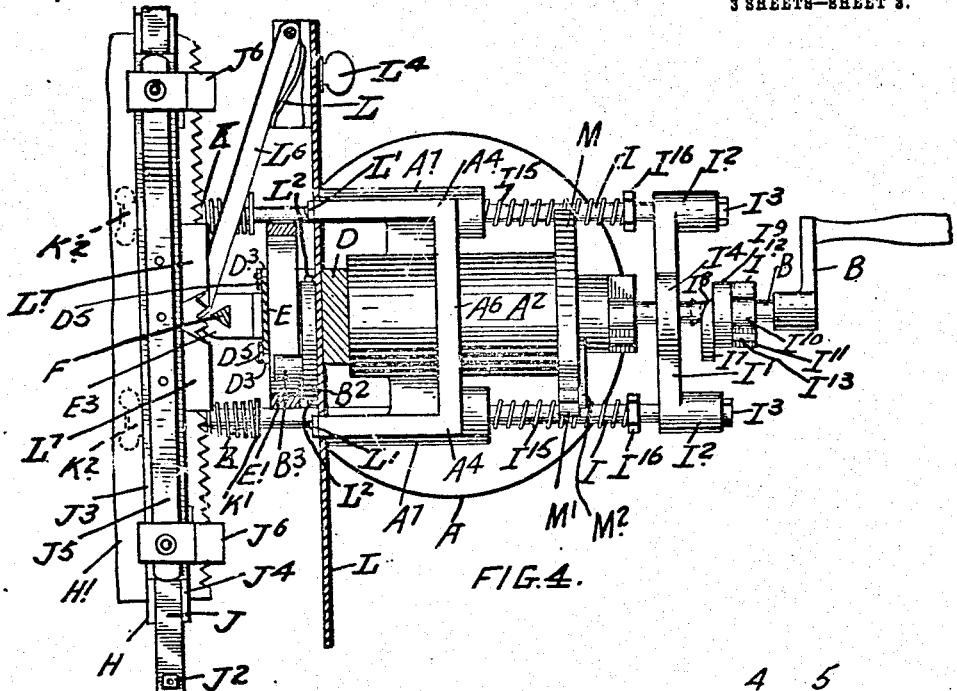
FIG. 4.
FIG. 7.
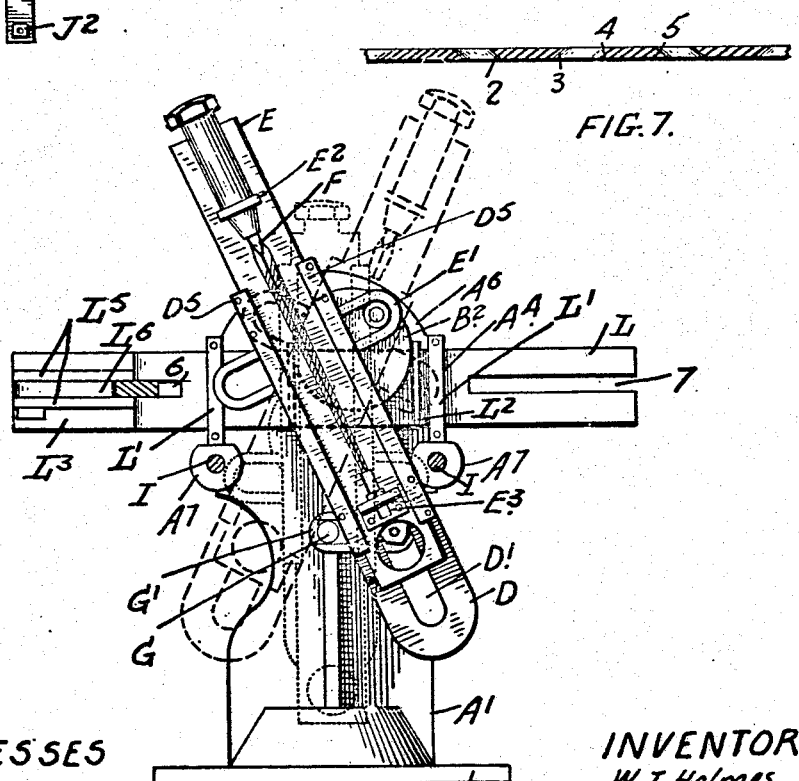
FIG. 5.

UNITED STATES PATENT OFFICE.

WILLIAM JOHN HOLMES, OF TORONTO, ONTARIO, CANADA.

SAW-FILING MACHINE.

No. 923,266.  Specification of Letters Patent.  Patented June 1, 1909.

Application filed January 6, 1908. Serial No. 409,503.

*To all whom it may concern:*

Be it known that I, WILLIAM JOHN HOLMES, of the city of Toronto, in the county of York, in the Province of Ontario, Canada, watchmaker, have invented certain new and useful Improvements in Saw-Filing Machines, of which the following is the specification.

My invention relates to improvements in saw-filing machines, and the object of the invention is to devise a machine which may be utilized with but slight and easy adjustment for filing either a cross cut or rip saw commonly used by carpenters.

A further object is to provide a means for readily adjusting the file to cut any desired size and depth of tooth.

A still further object is to provide a simple means for adjusting the feed according to the length of the tooth it is required to cut.

A yet further object is to devise a simple arrangement whereby the pressure of the saw on the file and the file on the saw may be varied according to the size of the tooth it is desired to operate upon. And a still further object is to arrange the feed so that the saw may be fed from right to left or vice-versa for the purpose of filing both sides of a cross cut saw, and the object generally is to produce a machine which will do accurate work in a minimum space of time and with a minimum amount of labor and it consists essentially of a base standard, a main shaft journaled therein, a cross head swung on one end of the shaft, a supporting plate for the file longitudinally slidable in the cross head, means operated by the main shaft for imparting a reciprocating movement to the plate and means for throwing the plate from one angular set to the opposing angular set before each downward movement of the file, a saw holder extending cross-wise of the file holder and file, means for feeding the saw tooth by tooth past the file after each tooth has been filed in either one direction or the other as desired, means for regulating the distance of the saw holder from the file, means for carrying the saw into operative position before each working stroke of the file and means for regulating the pressure of the saw against the file as hereafter more particularly explained by the following specification.

Figure 3:
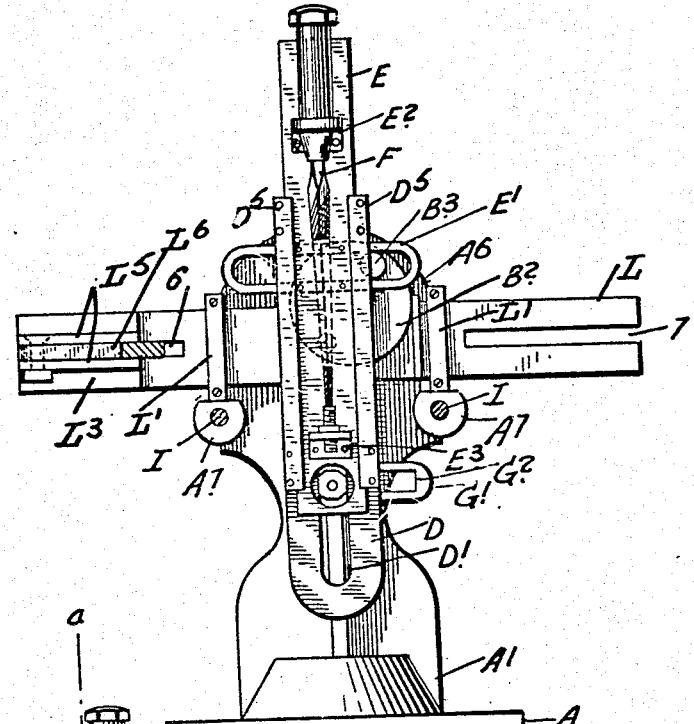
Figure 2:
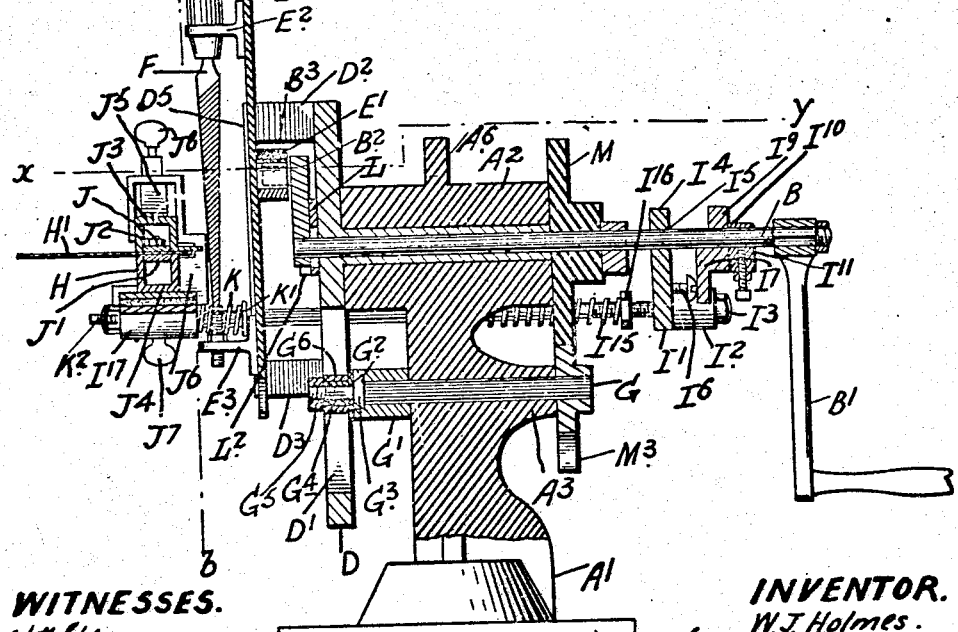

Figure 1 is a general perspective view of my machine. Fig. 2 is a longitudinal, vertical, sectional view of Fig. 1, passing through the main shaft B. Fig. 3 is a cross sectional view on line $a$—$b$ Fig. 2. Fig. 4 is a plan sectional view on line $x$—$y$ Fig. 2. Fig. 5 is a similar view to Fig. 2 showing the machine arranged to file a rip saw. Fig. 6 is an enlarged detail of the arm for swinging the file holder. Fig. 7 is a longitudinal sectional view through a portion of a rip saw.

In the drawing like characters of reference indicate corresponding parts in each figure.

A is the base casting and A' is a standard extending upwardly therefrom and provided with an upper main bearing $A^2$, a lower bearing $A^3$, forwardly extending side wings $A^4$ extending from each side of the central rib $A^6$ and provided with side bearings $A^7$. The front of the wings $A^4$ are provided with ways $A^8$ formed therein.

B is the main operating shaft supported in the bearing $A^2$ and provided with a suitable crank handle B' at one end and with a crank wheel $B^2$ having a crank pin $B^3$ at the other end.

D is a cross head swung centrally on the main shaft B. The crosshead D is provided with a slot D' extending longitudinally thereof below the main shaft B. The cross head D is also provided with upper and lower extensions $D^2$ and $D^3$ respectively. The extensions $D^2$ and $D^3$ are located to each side of the head and are provided with guide grooves $D^4$ to the inside thereof.

E is a longitudinally movable plate held in the grooves $D^4$ by the plates $D^5$ screwed to the front of the extensions $D^2$ and $D^3$.

E' is a slotted piece secured to or forming part of the plate E. The pin $B^3$ provided with a suitable roller extends into the slot of the piece E'.

$E^2$ and $E^3$ are brackets secured to the front face of the plate E and between which the file is secured.

G is a supplemental shaft journaled in the bearing $A^3$ and G' is an arm secured to the shaft G. The arm G' is provided with a dovetail slot $G^2$ as shown in detail in Fig. 6.

$G^3$ is a bolt having a dovetail head fitting within the slot $G^2$.

$G^4$ is a sleeve fitting over the bolt and secured thereon by a nut $G^5$.

G⁶ is a sleeve forming a friction roller loosely held on the inner sleeve G⁴ and extending into the slot D'.

When the machine is used for filing a crosscut saw the file is reciprocated vertically on the position shown in Figs. 1 to 4. In the above position the bolt G³ is held in the slot G² directly opposite the center of the shaft G thereby holding the crosshead D vertically without interfering with the rotation of the shaft G and the arm G'.

To give vertical reciprocating movement to the file I rotate the crank handle B', shaft B, eccentric B² and its pin B³. The pin B³ operates in the slot E' imparting a vertical reciprocating movement to the plate E and the file.

H is the saw holder for the saw H'. The file does its work on the saw on the downstroke and is free from the saw on the upstroke. I therefore provide the following mechanism whereby the saw holder is carried toward the file into operative position upon the completion of the upstroke of the file and away from the file upon the completion of the downstroke of the file.

I are rods longitudinally movable in the bearings A⁷.

I' is a cross piece provided with internally threaded bearing bosses I², into which the ends of the rods are screwed. The rods are secured in the bosses by locknuts I³. The cross bar I' is provided with an upwardly extending portion I⁴ having a hole I⁵ through which the main shaft B loosely extends.

I⁶ is a screw pin extending from the portion I⁴.

I⁷ is a segmental face cam having inclined ends I⁸. The cam is provided with a sleeve I⁹ through which the main shaft loosely passes.

I¹⁰ is a sleeve secured to the main shaft and provided with a segmental enlargement I¹¹ forming engaging shoulders I¹².

I¹³ are pins extending from the loose collar I⁹ and engaging with the shoulder I¹².

I¹⁵ is a compression spring.

I¹⁷ are bearings secured to the bottom of the saw holder H and through which the rods I loosely extend.

When the file starts its upward movement the cam I⁷ engages with the pin I⁶ forcing the cross piece I' and the rods I secured thereto longitudinally and the holder H secured to the rods away from the file. When the file reaches the downward limit of its stroke the pin I⁶ rides off the cam I⁷ and the rods I are moved longitudinally in the opposite direction by the compression springs I¹⁵ thereby carrying the holder toward and pressing the saw against the file.

The force which is exerted by the spring may be regulated by the nuts I¹⁶ which are threaded on the rods I.

When reversing the movement of the crank handle B' the sleeve I¹⁰ turns with the shaft B, the cam I⁷ and pin I¹³ remaining stationary during the downstroke of the file. Upon the completion of the downstroke, the other shoulder I¹² engages with the pin I¹³ carrying the saw out of engagement with the file during the upstroke.

I will now describe the construction of my sawholder.

J and J' are two clamping bars between which the saw is placed and clamped by the bolts J².

J³ and J⁴ are channel bars in the channels of which the bars J and J' are set. The lower channel bar J⁴ is secured to the bearings I¹⁷.

J⁵ is a spring secured to the top of the channel bar J³, and J¹⁰ are stop projections.

J⁶ are brackets secured to the lower channel bars J⁴ by the set screws J⁷. The brackets J⁶ have upward extensions straddling the bar J³ and the upward inclined ends of the spring J⁵.

J⁸ are set screws bearing on the spring J⁵. By means of the set screw J⁸ the saw is gripped between the channel bars J³ and J⁴ by spring pressure allowing the saw to feed therethrough.

To regulate the distance of the holder away from the file I provide a compression spring K extending between the bearing I¹⁷ and the washer K'.

K² are thumb nuts by which the holder may be forced toward the file against the tension of the spring K.

I will now describe the means by which the saw is fed.

L is a sliding bar held in the ways A⁸ by the plates L'.

L² are vertical ribs located to each side of the center of the plate L. The ribs L² coact with the cam to reciprocate the plate L. The plate L is provided with slotted ways 6 and 7 in which are held the bearing plates L³ by the set screw L⁴.

The plate L³ is provided with flanges L⁵ between which is pivoted the feeding pawl L⁶ which engages with a saw tooth.

L⁷ are plates extending from the base of the upper channel bar above the saw and having inclined inner ends which leave sufficient of the saw teeth exposed to engage with the feeding pawl.

The pawl L is spring-held against the saw by the spring L⁸.

By the above arrangement every time the file ascends and is away from the saw the feeding pawl engages the tooth next the tooth opposite the file and which is next the one last filed and pushes that tooth into place opposite the file. During the downward movement of the file the feeding pawl rides up onto one of the plates L⁷ disengaging it from the teeth of the saw. By adjusting the position of the plates L³ in the slots 6 and 7, the feed and consequently the size of the tooth may be regulated.

It will be seen that the machine so far as described is provided for cutting a vertical tooth, that is, a tooth used in a rip saw.

I will now describe how the machine is adapted to cutting a cross cut saw tooth.

M is a notched wheel. M' are rollers journaled on a plate M². The rollers M' extend over the notches in the wheel M.

M³ is an intermittent motion gear provided with diagonal slots and intermediate arc-shaped recesses fitting the periphery of the wheel M.

O is a pin extending from the hub of the wheel M and O' is a sleeve secured to the main shaft B and provided with a segmental enlargement engaging with the pin O.

The bolt G² is moved longitudinally toward the outer end of the slot thereby throwing the cross head D into an angular position as shown in Fig. 5.

By means of the gears M and M³ the cross head is swung from one side to the other around the main shaft so that on the downward movement of the file in the position shown in Fig. 5 the file operates against the side of the tooth 2 (see Fig. 7). As the file rises it changes its angular set into the position shown by heavy dotted lines in Fig. 5. Another tooth is then fed so that on the next downward movement of the file the side 3 of the tooth is cut. To cut the sides 4 and 5 the saw is fed in the opposite direction through the machine the feeding pawl being removed from the slot 6 to the slot 7, for this purpose.

From this description it will be seen that I have constructed a machine which will accomplish the various objects sought quickly and accurately with a minimum amount of labor.

What I claim as my invention is:

1. In a saw filing machine, the combination with the main bearing standard, the rotatable main shaft and the sharpening device operated by the main shaft, of a saw holder set crosswise of the file, longitudinally movable spring-held rods located to each side of the standard and supporting the saw holder at one end, a cross piece connecting the rod at the opposite end and a face cam secured to the rotatable shaft and designed to move the rods longitudinally through contact with the cross piece upon the upstroke of the file as and for the purpose specified.

2. In a saw filing machine, the combination with the main bearing standard, the rotatable main shaft, and the sharpening device, operated by the main shaft, longitudinal rods held in bearings to each side of the main standard, a saw holder secured thereto at their outer ends, nuts threaded on the longitudinal rods and to the rear of the sharpening device and the bearings of the rods, springs located between the nuts and the bearings of the rods tending to force the saw against the file, a face cam secured to the main shaft and a cross bar for connecting the inner ends of the rods together provided with a projection coacting with the face cam to impart longitudinal movement to the rods as and for the purpose specified.

3. In a saw filing machine, the combination with the main bearing standard, the rotatable main shaft, and the sharpening device operated from the main shaft, longitudinal spring held rods supported in bearings to each side of the main standard, a saw holder secured to the outer ends thereof and a cross bar connecting the inner ends thereof having a projecting portion, a face cam loosely held in the main shaft provided with a projection extending from the hub thereof, a sleeve secured to the shaft provided with a segmental enlargement engaging alternately with the projection extending from the face cam to correspond with the direction of rotation of the main shaft as and for the purpose specified.

4. In a saw filing machine, the combination with the main bearing standard, the rotatable main shaft, the crank wheel supported thereon and the longitudinally reciprocating file holder, of a reciprocating slotted slide plate provided with vertical ribs engaging the crank wheel, a bearing plate adjustably held in the slots and a feeding pawl pivoted to the plate and spring-held against the saw teeth as and for the purpose specified.

5. In a saw filing machine, the combination with the main bearing standard and the rotatable main shaft, of a cross head swung thereon, a file holder slidably held in the cross head, means operated by the main shaft for changing the angular set of the cross head alternately from one angle to the opposing angle and means for imparting longitudinal movement to the file holder as and for the purpose specified.

6. In a saw filing machine, the combination with the main bearing standard and the rotatable main shaft of a cross head swung thereon and having a longitudinal slot therein, a file holder slidably held in the cross head, means for imparting longitudinal movement to the file holder, a supplemental shaft, intermittent gears connecting the main shaft and the supplemental shaft and an arm connected to the supplemental shaft and provided with a projection extending into the slot of the cross head as and for the purpose specified.

7. In a saw filing machine, the combination with the main bearing standard and the rotatable main shaft, of a cross head swung thereon and having a longitudinal slot therein, a file holder slidably held in the cross head, means for imparting longitudinal reciprocating movement to the file holder, a supplemental shaft, intermittent gears connecting the main shaft and the supplemental shaft, an arm on the end of the supplemental shaft having a longitudinal slot extending radially from the center of the supplemental shaft, and bolt designed to be adjustably held in the slot as and for the purpose specified.

WILLIAM JOHN HOLMES.

Witnesses:
B. BRYD,
R. COBAIN.